US009962782B2

(12) United States Patent
Nispel

(10) Patent No.: US 9,962,782 B2
(45) Date of Patent: May 8, 2018

(54) INTERFACE BETWEEN KNIFE AND KNIFE HOLDER

(71) Applicant: WEBER MASCHINENBAU GMBH BREIDENBACH, Breidenbach (DE)

(72) Inventor: Thomas Nispel, Dautphetal (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 165 days.

(21) Appl. No.: 14/506,190

(22) Filed: Oct. 3, 2014

(65) Prior Publication Data
US 2015/0090093 A1  Apr. 2, 2015

Related U.S. Application Data

(63) Continuation of application No. PCT/EP2013/057186, filed on Apr. 5, 2013.

(30) Foreign Application Priority Data

Apr. 5, 2012  (DE) .......................... 10 2012 007 013

(51) Int. Cl.
*B23D 61/10* (2006.01)
*B23D 61/02* (2006.01)
(Continued)

(52) U.S. Cl.
CPC ............. *B23D 61/10* (2013.01); *B23D 61/02* (2013.01); *B23D 61/025* (2013.01);
(Continued)

(58) Field of Classification Search
CPC .. B27B 5/00; B27B 5/32; B27B 5/325; B23D 61/02; B23D 61/025; B23D 61/10;
(Continued)

(56) References Cited

U.S. PATENT DOCUMENTS 34,754 A  3/1862 Holcomb
1,947,662 A  2/1934 Robinson
(Continued)

FOREIGN PATENT DOCUMENTS

CA  2290178 A1  9/2000
CH  125199 A  4/1928
(Continued)

OTHER PUBLICATIONS

English Translation of DE4114059.*
(Continued)

*Primary Examiner* — Jennifer Swinney

(57) ABSTRACT

The invention relates to an interface between a knife and a knife holder, wherein the knife and the knife holder are designed such that the knife can be mounted on the knife holder in such a way that the knife is initially positioned on the knife holder in the axial direction, and then by rotating either the knife relative to the knife holder and/or the knife holder relative to the knife, the knife is locked on the knife holder with respect to the axial direction, wherein the knife has a single central fastening opening which is delimited by a knife edge region, and the knife holder has a fastening section for the fastening opening of the knife, which is delimited by a holder edge region.

45 Claims, 6 Drawing Sheets

Figure 3:
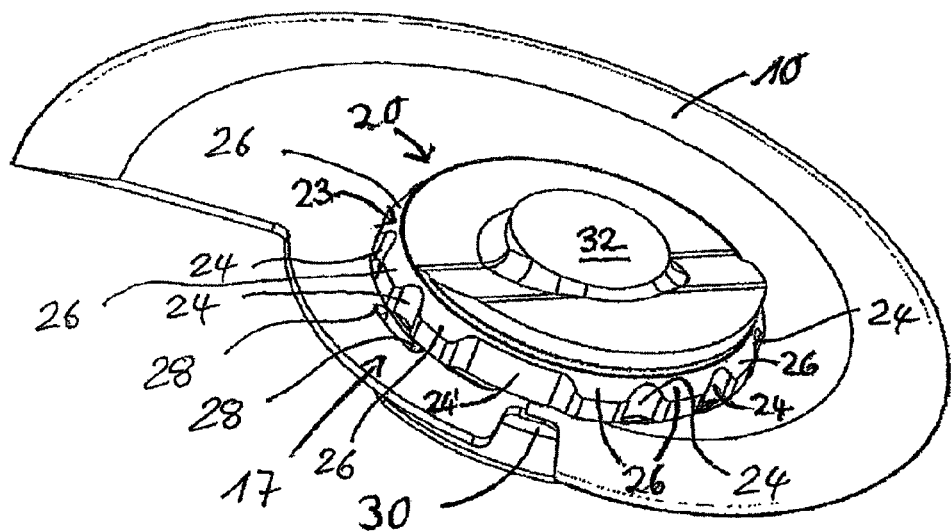

(51) Int. Cl.
  *B26D 1/00*  (2006.01)
  *B26D 7/26*  (2006.01)
  *B26D 3/28*  (2006.01)

(52) U.S. Cl.
  CPC ......... *B26D 1/0006* (2013.01); *B26D 7/2621* (2013.01); *B26D 2001/0046* (2013.01); *B26D 2003/286* (2013.01); *B26D 2210/02* (2013.01); *Y10T 83/9401* (2015.04); *Y10T 83/9464* (2015.04)

(58) Field of Classification Search
  CPC ...... B23D 1/25; B26D 7/2621; B26D 1/0006; B26D 2210/02
  See application file for complete search history.

(56) References Cited

U.S. PATENT DOCUMENTS

| | | | |
|---|---|---|---|
| 2,600,459 A | 6/1952 | Adams | |
| 3,610,304 A | 10/1971 | Popeil et al. | |
| 3,734,548 A | 5/1973 | Kieves | |
| 3,889,333 A * | 6/1975 | Katz | B27B 5/325 |
| | | | 144/237 |
| 3,921,485 A | 11/1975 | Tobey et al. | |
| 4,660,453 A | 4/1987 | Fischer et al. | |
| 4,730,952 A | 3/1988 | Wiley | |
| 5,107,737 A * | 4/1992 | Tagliaferri | B23B 31/40 |
| | | | 144/218 |
| 5,447,086 A * | 9/1995 | Wittmaier | B23C 5/26 |
| | | | 83/666 |
| D394,530 S | 5/1998 | Roeker | |
| 5,989,116 A | 11/1999 | Johnson et al. | |
| D427,042 S | 6/2000 | Dibbern et al. | |
| 6,116,996 A * | 9/2000 | Yanase | B24B 23/02 |
| | | | 451/359 |
| 6,227,092 B1 | 5/2001 | Ivel et al. | |
| 6,276,879 B1 | 8/2001 | Hecht | |
| 6,450,075 B1 | 9/2002 | Manzo | |
| 6,591,725 B1 * | 7/2003 | Martin | B23D 45/062 |
| | | | 83/471.3 |
| 6,869,346 B2 * | 3/2005 | Wendt | B24B 23/02 |
| | | | 451/342 |
| 7,287,310 B2 | 10/2007 | Zuzelo | |
| D638,863 S | 5/2011 | Huh | |
| 8,776,657 B2 | 7/2014 | Menze | |
| 2005/0192585 A1 * | 9/2005 | Simmons | B23D 51/10 |
| | | | 606/82 |
| 2008/0115647 A1 | 5/2008 | Wang | |
| 2009/0013845 A1 | 1/2009 | Zhu et al. | |
| 2011/0179931 A1 * | 7/2011 | Menze | B27B 5/32 |
| | | | 83/666 |
| 2011/0277611 A1 | 11/2011 | Chen et al. | |
| 2011/0296964 A1 | 12/2011 | Muller et al. | |
| 2012/0170976 A1 | 7/2012 | Cai | |
| 2014/0090535 A1 | 4/2014 | Muller et al. | |
| 2015/0090091 A1 | 4/2015 | Nispel | |

FOREIGN PATENT DOCUMENTS

| | | | |
|---|---|---|---|
| CH | 703182 A1 | 11/2011 | |
| CN | 202045628 U | 11/2011 | |
| DE | 1265363 B | 4/1968 | |
| DE | 1629991 A1 | 3/1971 | |
| DE | 3637733 A1 | 5/1987 | |
| DE | 3935485 A1 * | 5/1990 | ............ B24B 45/00 |
| DE | 4031671 A1 | 4/1992 | |
| DE | 4114059 A1 * | 11/1992 | ........... B23D 35/008 |
| DE | 19822104 A1 | 11/1999 | |
| DE | 10044999 A1 | 5/2001 | |
| DE | 10108018 A1 | 9/2002 | |
| DE | 102004051669 A1 | 4/2006 | |
| DE | 102004035627 B3 | 5/2006 | |
| DE | 102005034476 * | 1/2007 | ......... B23B 31/4073 |
| DE | 202007010399 U1 | 9/2007 | |
| DE | 102008019776 A1 | 10/2009 | |
| DE | 102008020293 A1 | 10/2009 | |
| DE | 202009017954 U1 | 9/2010 | |
| DE | 102009032974 A1 | 1/2011 | |
| EP | 0798064 A1 * | 10/1997 | ......... B23B 31/4073 |
| EP | 1022101 A2 | 7/2000 | |
| EP | 2425940 A1 | 3/2012 | |
| FR | 631683 A | 12/1927 | |
| SU | 745674 A1 * | 7/1980 | ........... B23D 47/005 |
| WO | WO-2007103899 A2 | 9/2007 | |
| WO | WO-2013/150133 A1 | 10/2013 | |

OTHER PUBLICATIONS

English Translation of CH 703182.
International Search Report (in English and German) for PCT/EP2013/057186, dated Sep. 17, 2013; ISA/EP.
English translation of DE10044999.

* cited by examiner

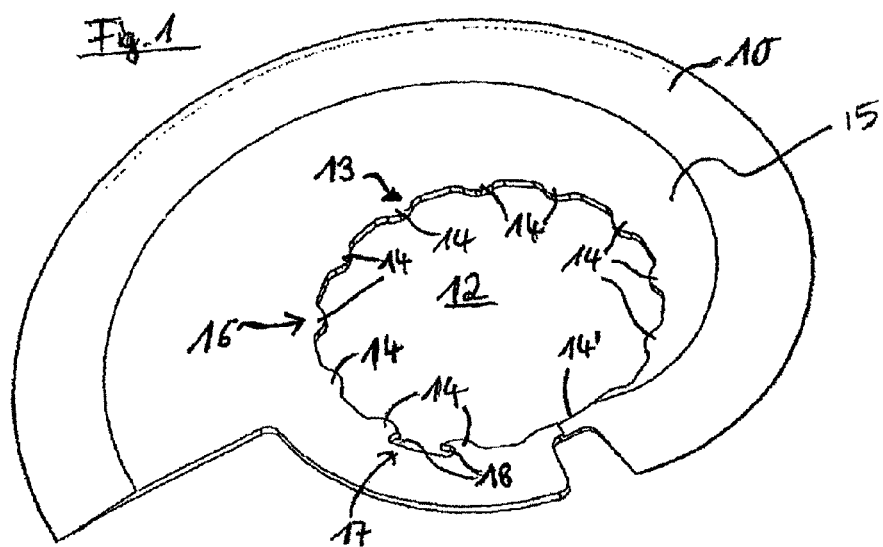
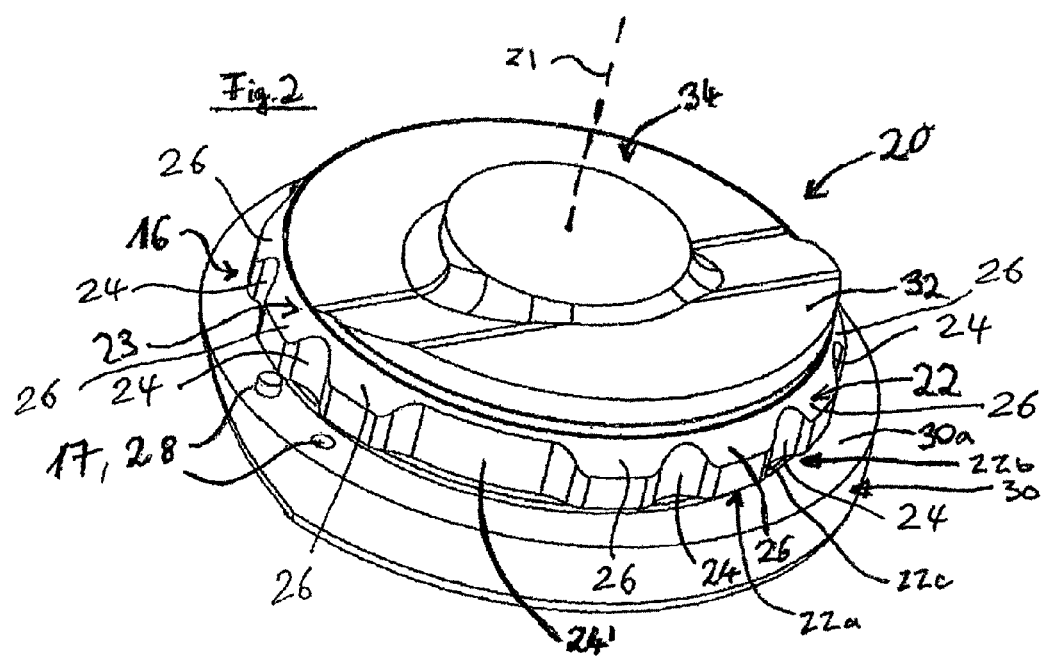

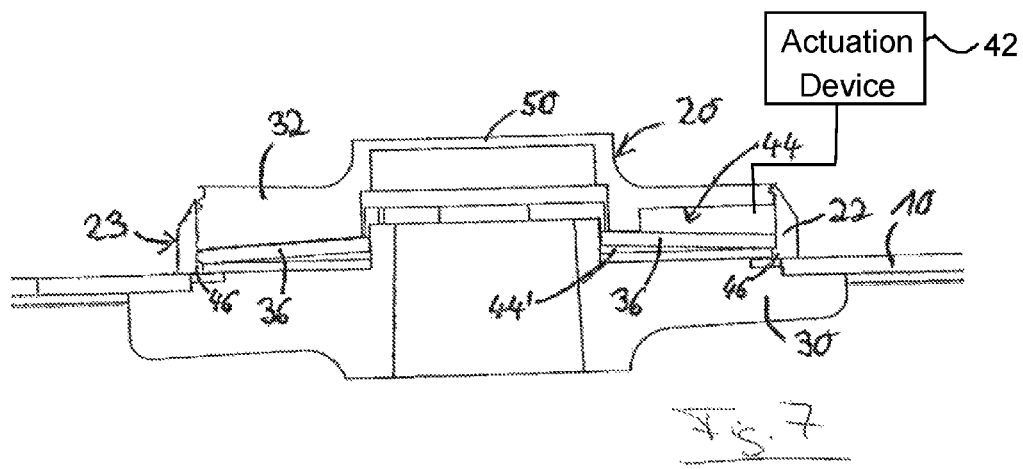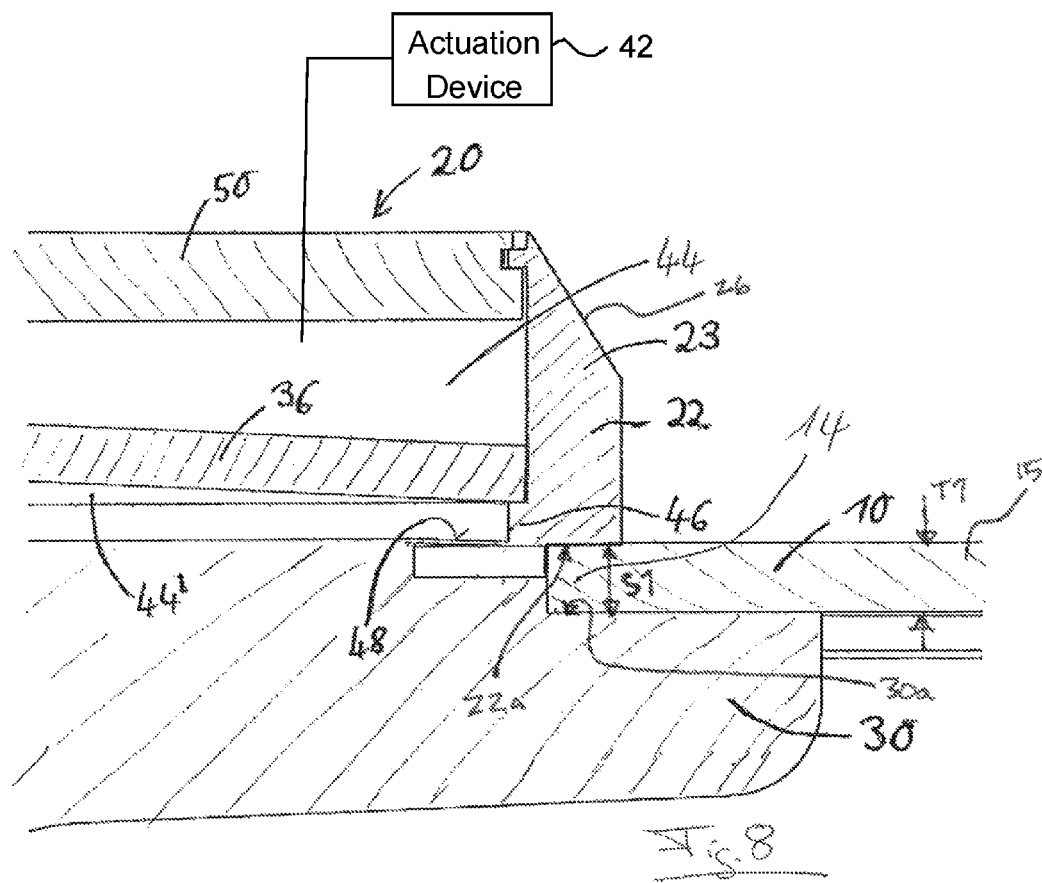

INTERFACE BETWEEN KNIFE AND KNIFE HOLDER

CROSS-REFERENCE TO RELATED APPLICATIONS

This application is a continuation of PCT International Application No. PCT/EP2013/057186, filed on Apr. 5, 2013. This application claims the benefit and priority of German Patent Application No. 10 2012 007 013.6, filed on Apr. 5, 2012. The entire disclosures of the above applications are incorporated herein by reference.

BACKGROUND

This section provides background information related to the present disclosure which is not necessarily prior art.

Technical Field

The invention relates to an interface between a blade and a blade mount.

Discussion

This section provides a general summary of the disclosure, and is not a comprehensive disclosure of its full scope or all of its features.

The invention inter alia relates to a blade for high-speed slicers as well as to a blade mount for high-speed slicers. At least one circular blade, in particular circulating in a planetary motion, and/or at least one scythe-like blade can be used as the blade in this respect.

The blade is typically usually screwed to the blade mount for fastening a blade to a blade mount. This frequently turns out to be difficult since the blade in this respect simultaneously has to be held. It is therefore difficult for an individual user to attach a blade to a blade holding device alone, in particular without aids. The same disadvantages apply accordingly to the dismantling of the blade from the blade mount.

This is in particular disadvantageous since, for example, blades which have become blunt have to be replaced relatively frequently. The replacement is thus difficult and time-consuming.

SUMMARY

It is an object of the invention to provide an interface at a high-speed slicer which makes it possible to attach the blade simply and reliably to a blade mount and to remove it therefrom again.

A plurality of these subjects or all these subjects as well as the subordinate aspects respectively disclosed here can be combined with one another and protection is also claimed for such combinations, for example for the combination of a bayonet fastening, a clamping device and a counterweight, the latter in particular as a component of the blade mount and of the clamping device for the blade simultaneously.

The term "blade mount" should be understood as meaning the same as the terms "blade holding device" and "blade holder".

There are basically two possibilities with respect to the mounting of the blade, that is its attachment to the blade mount.

On the one hand, the blade can, for example, first be provided with a handling apparatus which surrounds the cutting edge and which in this case also serves as a blade protection and can be mounted together with this blade protection.

On the other hand, it is also conceivable to configure the handling apparatus for attaching a blade to a blade mount of a high-speed slicer as an automatic changer or at least as a part of an automatic changer. For this purpose, such a changer holds the blade, moves it toward the blade mount and mounts it there fully automatically. The changer can have two or more spaces for blades in the manner of a blade magazine, the blades being able to be led up to the blade mount selectively by adjustment of the changer in order to take up a blade to be replaced automatically at an empty space and then to move a space occupied by a blade to be attached to the blade mount in order to attach the blade automatically.

The dismantling can also take place correspondingly manually or automatically.

The invention relates to a blade for high-sped slicers which is configured such that it can be attached to a blade mount of the slicer such that the blade is first set onto the blade mount in an axial direction and is subsequently locked with respect to the axial direction at the blade mount by rotation—either of the blade relative to the blade mount and/or of the blade mount relative to the blade—with the blade in particular having a single central fastening opening which is bounded by a marginal blade region.

In accordance with the invention, the blade can in this respect be rotated with respect to the blade mount, which is in particular stationary, or the blade can conversely be held against rotation by hand or by suitable means and the blade mount can be rotated with respect to the held blade. In principle, an embodiment is also conceivable in which both the blade and the blade mount are rotated. If within the framework of this disclosure a rotation of the blade mount is spoken of, embodiments are also to be understood thereby in which only a part of the blade mount is rotated, for example a part which is called a "first part" in the following and which is also called a fastening section.

Additional fastening means such as screws are, for example, not necessary in this manner. The use of tools is also not compulsory. This allows a simple handling of the blade.

A single operator or an automatic blade changer can thus, for example, also mount or dismantle a blade at the blade mount.

The blade is preferably locked with respect to the axial direction at the blade mount in that the blade is rotated, preferably opposite to the direction of rotation of the blade in slicing operation. The blade is thus secured on the blade mount and cannot release itself during the slicing process. As already mentioned, the blade mount can alternatively or additionally be rotated.

In accordance with an embodiment, the blade has the same axial thickness in a marginal blade region bounding a fastening opening of the blade as in an inner blade region adjacent to the marginal blade region, with in particular the marginal blade region at the rear blade side and/or at the front blade side merging in a flush manner, in particular an areally flush manner, into the inner blade region. Alternatively, the axial thickness in the marginal blade region can be smaller than in the adjacent inner blade region, with in particular the transition between the marginal blade region and the inner blade region not taking place in a flush manner. An axial spacing at a blade mount, which will be looked at in more detail in the following, can be smaller due to a thinner marginal blade region than with a thicker marginal blade region.

The blade can in particular be manufactured simply and inexpensively by a uniform thickness, i.e. with the same thickness of marginal blade region and inner blade region. For example, only a fastening opening is thus cut out of the blade, for example by means of a laser.

No additional, unwanted imbalance of the blade, which optionally has to be compensated, also occurs by a uniform thickness.

In accordance with a further embodiment, a marginal blade region bounding a fastening opening of the blade for fastening to the blade mount differs from a circular shape. The marginal blade region can, for example, have the shape of an ellipse or of a polygon. The marginal blade region in particular extends in a meandering manner. Alternatively or additionally, the marginal blade region can comprise a plurality of blade projections which are arranged spaced apart in the peripheral direction, which are radially inwardly directed and which in particular alternate with blade recesses. The blade projections can, for example, be configured as rounded lugs or tongues. It is, however, also conceivable to configure them, for example, as angled and/or pointed.

In accordance with a further embodiment, the blade can be locked with the blade mount via a bayonet fastening. The blade is securely fastened to the blade mount by the bayonet fastening and is in particular secured against any unwanted release.

A marginal blade region bounding a fastening opening of the blade preferably differs from a circular shape and is configured as a component of the bayonet fastening. The marginal blade region in particular extends in a meandering manner in this respect. Alternatively or additionally, the marginal blade region can comprise a plurality of blade projections arranged spaced apart in the peripheral direction and directed radially inwardly. The blade itself therefore forms a part of the bayonet fastening. Additional fastenings are not necessary, but are nevertheless conceivable.

In accordance with a further embodiment, radially inwardly directed blade projections of a marginal blade region bounding a fastening opening of the blade are formed as components of the bayonet fastening. In this respect, at least two blade projections are in particular provided to secure the blade sufficiently.

In accordance with a further embodiment, the blade has a blade-side component of a security against rotation, with the component in particular comprising a cut-out, preferably a cut-out extending in the peripheral direction and having two end sections. A plurality of cut-outs can also be provided. The cut-out can, for example, be located outside of a marginal blade region in the blade. The cut-out can e.g. be milled into or cut out of the blade for this purpose. Alternatively to the cut-outs, pins are, for example, also conceivable which form a part of a security against rotation.

In accordance with a further embodiment, the cut-out is arranged between two projections of the marginal blade region which follow one another in the peripheral direction and which are directed radially inwardly. It is also conceivable to arrange a cut-out between a plurality of projections of the marginal blade region.

The projections of the marginal blade region thus satisfy a dual function since they represent a component of a bayonet fastening and simultaneously a component of a security against rotation.

In accordance with a further embodiment, a marginal blade region bounding a fastening opening of the blade is configured as a component of an attachment aid. The marginal blade region in this respect hat least one, preferably precisely one, asymmetrical portion at which the marginal blade region differs from a regular extent. In this manner, a positioning of the blade at a blade mount point is possible at preferably precisely one single. Additional markings and/or openings into which, for example, positioning pins of a blade mount engage at a specific position are thus not necessary, but nevertheless additionally conceivable.

In accordance with a further embodiment, the asymmetrical portion is formed by a radially inwardly directed blade projection which differs with respect to its shape and/or size from other radially inwardly directed blade projections of the marginal blade region. It is also conceivable that a blade recess alternatively or additionally has an asymmetrical portion between the projections. A plurality of asymmetrical blade projections and/or blade recesses are also conceivable. An asymmetrical blade projection and/or an asymmetrical blade recess can, for example, have a different width and/or length than the other blade projections or blade recesses respectively. The asymmetrical portion is preferably formed by a blade projection wider in comparison with the other blade projections.

The asymmetrical portion can generally be formed by an irregular size, in particular width and/or height, of a plurality of blade projections and/or blade recesses.

In accordance with a further embodiment, a fastening opening of the blade has a circular basic shape, with the central axis of the fastening opening coinciding with an axis of rotation of the blade. The shape of the blade recesses preferably corresponds to this circular basic shape. The rotational center of the blade is thus not radially offset so that no eccentric offset takes place.

In accordance with a further embodiment, the radius of a fastening opening of the blade amounts to at least 1/10, in particular at least 1/9, 1/8, 1/7, 1/6, 1/5, 1/4, 1/3, 1/2, 2/3, 3/4 or 4/5, of the largest radius of the blade. Alternatively or additionally, the size of the fastening opening amounts to at least 1/6, in particular at least 1/5, 1/4, 1/3, 1/2, 2/3, 3/4 or 4/5, of the total surface of the blade. The fastening opening is thus comparatively large, in particular larger than an opening such as is required, for example, for a conventional fastening with the aid of screws. Material costs are saved by the large fastening opening. In addition, the weight of the blade is reduced. Less weight than with conventional blades thus has to be accelerated on starting up. Axially acting forces are also, for example, better distributed over the radially inwardly directed blade projections by the large fastening opening, The invention additionally relates to a blade mount for high-speed slicers which is configured such that a blade in accordance with the invention can be attached such that the blade is first set onto the blade mount in an axial direction and is subsequently locked at the blade mount with respect to the axial direction by rotation—either of the blade relative to the blade mount and/or of the blade mount relative to the blade—wherein in particular the blade mount has a fastening section for the fastening opening of the blade which is bounded by a marginal mount region.

The blade is thus secured with the aid of the blade mount. An axial movement of the blade is thus prevented in the locked state.

In accordance with a further embodiment, a marginal mount region bounding a fastening section of the blade mount is configured at least regionally, in particular at least substantially over its total periphery, complementary to the marginal blade region. The marginal mount region therefore so-to-say represents a "positive" to a "negative" in the form of the marginal blade region. The blade can thus be attached exactly to the blade mount.

In accordance with a further embodiment, a marginal mount region bounding a fastening section of the blade mount comprises a plurality of mount projections arranged spaced apart in the peripheral direction and directed radially outwardly. The mount projections are in particular formed complementary to the blade recesses. The blade can thus be pushed over the marginal mount region by the blade recesses.

In addition, a marginal mount region bounding a fastening section of the blade mount can have mount recesses between the mount projections. The mount recesses are in particular formed complementary to the blade projections.

In accordance with a further embodiment, a marginal mount region bounding a fastening section of the blade mount differs from a circular shape and is configured as a component of a bayonet fastening between the blade mount and the blade. The blade can thus be attached securely to the blade mount. An additional fastening is admittedly conceivable, but not absolutely necessary.

In accordance with a further embodiment, the blade mount has a mount-side component of a security against rotation for the blade, wherein the component in particular comprises at least one securing pint, in particular two securing pins spaced apart in the peripheral direction. Alternatively, it is also conceivable to attach the securing pins to the blade, for example. In this case, the blade mount has recesses for the securing pins.

At least one securing pin can preferably be lowered against a restoring force by means of the blade on the attachment of the blade. The blade is thus set onto the blade mount. A securing pin is pressed downwardly in this respect. After a rotation of the blade and/or of the blade mount, this securing pin latches into a cut-out and thus secures the blade against a rotation. Alternatively, a plurality of securing pins are also conceivable which can be arranged at different points of the blade mount. The restoring force of the securing pins is provided via springs, for example.

In accordance with a further embodiment, the security against rotation is arranged or formed at a contact surface for the blade disposed radially outside a marginal mount region bounding a fastening section of the blade mount. This is particularly favorable from a technical design aspect. Attaching the security against rotation to the marginal mount region would nevertheless equally be conceivable.

In accordance with a further embodiment, the blade mount has a contact section having a contact surface for the blade which is set back in an axial direction with respect to a marginal mount region bounding a fastening section of the blade mount, wherein an axial spacing is in particular present between a contact plane defined by the contact surface and a locking plane which is defined by the rear side of the marginal mount region facing in the direction of the contact plane, wherein in particular the axial spacing can be varied. The blade mount is thus not static. Individual components of the blade mount can be moved with respect to one another in the axial direction. Such a movability can be utilized for one or more additional functions and e.g. for a tensioning device or clamping device for the blade.

The invention additionally relates to a system having a blade in accordance with the invention and a blade mount in accordance with the invention.

In accordance with an embodiment, a marginal mount region of the blade mount has a larger axial thickness than a marginal blade region of the blade. This inter alia ensures a high stability of the marginal blade region and of the blade mount overall.

In accordance with a further embodiment, a marginal blade region of the blade and a marginal mount region of the blade mount are coordinated with one another such that a relative rotation of the blade and the blade mount is suppressed on the setting on of the blade until the marginal blade region has passed the marginal mount region. The blade is thus set on and is in particular moved over the comparatively thick marginal mount region. The shape of the marginal mount region and the shape of the marginal blade region are in particular complementary to one another such that a rotation is not possible during the setting on. The blade thus enters into an unambiguous angular position with respect to the contact surface.

In accordance with a further embodiment, an axial spacing between a contact plane and a locking plane of the blade mount is larger in at least a release state of the blade mount than the axial thickness of a marginal blade region bounding the fastening opening. It can be ensured in this manner that the blade can be rotated on the blade mount in the release state—either by rotating the blade relative to the blade mount and/or by rotating the blade mount relative to the blade. A certain "clearance" is thus present. The axial spacing between the contact plane and the locking plane of the blade mount can—as mentioned above—be the smaller, the thinner the marginal blade region is configured.

In a preferred embodiment, the axial spacing is smaller than 1 mm. It is in particular smaller than 0.5 mm, preferably smaller than 0.3 mm and preferentially smaller than 0.1 mm. The "clearance" of the blade is thus relatively small, but is sufficient to be able to rotate the blade and the blade mount with respect to one another.

The invention moreover relates to a blade mount for high-speed slicers, in particular as described above, having a clamping device for a blade, in particular for a blade in accordance with the invention. The clamping device can be adjusted between a release state and a clamping state. The blade is clamped between a first part and a second part of the blade mount in the clamping state. The blade and the blade mount can in particular be rotated with respect to one another in the released state. In the clamping state, in contrast, a rotation of the blade and the blade mount relative to one another is not possible.

In accordance with a further embodiment, the first part is formed by a component of a bayonet fastening for locking the blade at the blade mount. The first part thus satisfies a dual function since it locks the blade at the blade mount, on the one hand, and can additionally clamp the blade, on the other hand.

In accordance with a further embodiment, the first part is formed by a fastening section for a fastening opening of the blade, in particular by a marginal mount region bounding the fastening section. The first part can thus satisfy a further function. An additional component for the fastening of the blade is thus not absolutely necessary, but nevertheless conceivable.

In accordance with a further embodiment, the first part is formed by a plurality of mount projections arranged spaced apart in the peripheral direction and directed radially outwardly. The first part in particular has lugs which are formed complementary to blade recesses. In this manner, the blade can be received in an exact position.

In accordance with a further embodiment, the second part is formed by a contact section for the blade. The blade is thus in particular clamped between mount projections and a contact section. The contact section is configured, for example, as a circular plate or circular ring.

In accordance with a further embodiment, the clamping device comprises a spring arrangement which acts between the first part and the second part and is in particular under preload.

The clamping device is preferably preloaded into the clamping state. If the blade is thus located between the first and second parts, it is clamped between these parts. An unintentional release of the blade is thus prevented. The preload in particular has to be actively overcome to remove the blade from the blade mount.

In accordance with a further embodiment, the clamping device comprises at least one plate spring and/or at least one plate spring package. A plate spring has the advantage that the tension of the spring is distributed onto the blade uniformly and/or over the total periphery. The plate spring can in particular press indirectly or directly onto blade projections.

In accordance with a further embodiment, an actuation device is provided for the clamping device and the clamping device can be adjusted by means of it between the release state and the clamping state.

The clamping device is in particular preloaded into the clamping state and an actuation device is provided which is configured such that the clamping device changes from the clamping state into the release state on the actuation of the actuation device against the action of the preload.

To be able to release the blade, a clamping device thus has to be actively overcome. In the release state, the blade can subsequently be rotated again and can be removed, for example.

In accordance with a further embodiment, the clamping device is adjustable by setting on the blade, in particular by moving the blade or a handling apparatus for the blade relative to the blade mount. The actuation device is therefore in particular actuated by the setting on of the blade. Alternatively, actuation devices are also conceivable which are not in direct relationship with the setting on of the blade. A button, a hand switch or foot switch or a lever or a computer control would be conceivable, for example, by which the actuation device can be actuated. A manual actuation can in particular be provided which requires an active, deliberate action of an operator.

In accordance with a further embodiment, the actuation device is configured such that the clamping device changes from the clamping state into the release state on actuation of the actuation device against the action of a preload. In particular the pressure of a spring is overcome by the actuation device. To be able to release the blade, the preload thus has to be actively overcome with the aid of the actuation device. An unwanted release of the blade is thus prevented.

In accordance with a further embodiment, the actuation device comprises a pneumatic device, a hydraulic device or an electric device.

The actuation device preferably pressurizes a closed inner space of the blade mount on actuation. In particular compressed air is used for this purpose. The compressed air can, for example, be supplied from the inside to the blade mount, that is in particular via the second part. It is also conceivable to supply the compressed air to the blade mount from the front, that is, for example, via the first part. Alternatively, an external supply of compressed air is also conceivable, for example via a handling apparatus, in particular a manual carrier with blade protection or an automatic blade changer, e.g. as is explained above.

If compressed air, for example, unintentionally escapes from the inner space, the blade is automatically clamped. This represents a large gain in safety.

In accordance with a further embodiment, the inner space is bounded by at least two sections of the blade mount which are movable relative to one another to adjust the clamping device, which are connected to the first and second parts or which are identical, wherein the two sections are in particular connected to one another by a membrane skin which is configured movable in the manner of a film hinge. A relative movability of the otherwise substantially rigid first and second sections is in particular made possible by the membrane skin. A whole part, which is admittedly in one piece, but is simultaneously movable per se, can in particular be realized by means of the film hinge. At the same time, the membrane skin ensures that the inner space remains closed and the supplied compressed air cannot escape. The membrane skin therefore so-to-say forms a joint. The membrane skin can, for example, comprise a rubber material, but can alternatively be formed by a thin metal strip which is connected or configured in one piece with the two sections.

In accordance with a further embodiment, a spring arrangement of the clamping device is arranged in the inner space and acts between the two sections movable relative to one another. If now, for example, compressed air is supplied into the inner space, the first and second sections move apart from one another. The spring arrangement, which is connected both to the first section and to the second section, is thereby also further tensioned. The blade is released in this manner.

Alternatively or additionally to a pneumatic device, a hydraulic device or an electric device, the actuation device comprises a mechanical clamping element, in particular a screw. This is in particular active between the first part and the second part. The clamping element is arranged centrally at the blade mount, for example. If the clamping element is, for example, moved from the first section toward the second section, it presses centrally onto a plate spring, whereby the end regions of the plate spring are moved upwardly. The blade is thus released from its clamping state.

The invention additionally relates to a system having a blade in accordance with the invention and having a blade mount in accordance with the invention.

In accordance with a further embodiment, the clamping device clamps the blade at a marginal blade region which bounds a central fastening opening of the blade, in particular at a plurality of radially inwardly directed blade projections of the marginal blade region. A plate spring thus in particular presses indirectly or directly onto the marginal blade region or onto blade projections of the marginal blade region. Blade projections are, however, not absolutely necessary for the clamping device. It is thus also conceivable that a clamping device clamps the blade at a marginal region which e.g. has no projections, but rather a uniform, for example circular, elliptic or oval contour.

The invention also relates to a handling apparatus for attaching a blade to a blade mount of a high-performance slicer. This handling apparatus can, for example, be a blade carrier with blade protection to be carried or held by hand. The handling apparatus can, however, also be a component of an automatic changer or can itself represent the automatic changer which can fully automatically mount and dismantle a blade. With an automatic changer, no operator is thus required who sets the blade onto a blade mount by hand or removes it from the blade mount by hand.

The handling apparatus can be configured to satisfy at least one additional function in addition to holding the blade.

To mount a blade on a blade mount or to dismantle the blade, the blade can be held by a handling apparatus formed as a simple carrier. If the handling apparatus is provided with a blade protection, in particular holding handles are provided. The blade can thus also be handled and carried easily by a single operator. In the prior art, such a carrier only serves for holding the blade on attaching and removing.

It is the underlying idea of the invention that this handling apparatus can satisfy at least one further function in addition to holding the blade.

In accordance with an embodiment, the additional function comprises the release of a security against rotation, in particular of at least one securing pin, which secures the blade at the blade mount. A plunger or another actuation member can be provided in the handling apparatus for this purpose, for example. If the handling apparatus is now attached to the blade for removing the blade from the blade mount, the plunger or the actuation member of the handling apparatus acts on the securing pin, which is in particular preloaded, of the security against rotation. Since the handling apparatus and the blade are rotationally fixedly connected to one another, the blade can now be rotated. The security against rotation is released by the handling apparatus in this manner. No further steps or apparatus for releasing the security against rotation are required due to this dual function of the handling apparatus.

In accordance with a further embodiment, the additional function comprises the adjustment of a clamping device of the blade mount between a clamping state clamping the blade and a release state. The handling apparatus thus, for example, serves as an actuation device. An additional actuation device, for example an external actuation device, is thus not necessary.

In accordance with a further embodiment, the additional function comprises the storage of energy, in particular of current or of a pressurized fluid, with in particular the handling apparatus comprising a rechargeable energy store. The handling apparatus can thus contain a pressure tank filled with compressed air, for example. In particular handles formed as tubes or reinforcements of brass carriers known from the prior art can be converted relatively easily to a pressure tank so that volume anyway present can be additionally utilized.

In accordance with a further embodiment, the additional function comprises the output of energy, in particular stored energy, to the blade mount.

Compressed air which can be stored in the handling apparatus is thus, for example, output to the blade mount for actuating the actuation device. It is alternatively also conceivable that the pressurized fluid is supplied via a line to the handling apparatus. It is also conceivable that energy is first supplied via a power line to the handling apparatus, and is subsequently output from it to the blade mount. An energy store in the handling apparatus is thus not absolutely necessary. It is alternatively or additionally also conceivable that the actuation device is actuated non-contactlessly with the help of magnets which are arranged in the handling apparatus or in a different manner.

In accordance with a further embodiment, the handling apparatus comprises a coupling section for the blade mount via which energy, in particular stored energy, can be output to the blade mount. The coupling section is in particular sealed to the outside so that no pressurized fluid can escape.

The invention moreover relates to a system having a blade, in particular a blade in accordance with the invention, and having a blade mount in accordance with the invention as well as a handling apparatus in accordance with the invention, wherein the handling apparatus automatically initiates an adjustment of a clamping device of the blade mount between a clamping state and a release state on the attachment and/or removal of the blade. If the blade is therefore set onto the blade mount by the handling apparatus, for example, the actuation device is actuated in that, for example, compressed air is output from the handling apparatus into the blade mount. A release state is thereby achieved in which the blade and the blade mount can be rotated with respect to one another. If the compressed air is again let out of the inner space, the blade is clamped. To remove the blade, a pressurized fluid must therefore again be supplied, for example, to release the clamping state.

In accordance with a further embodiment, the handling apparatus and the blade mount each comprise a coupling section, wherein the coupling section is configured and arranged such that the two coupling sections enter into operative engagement with one another on the setting on of the blade and stored energy and/or control signals can be transferred via the coupling sections. A current contact is therefore established, for example. Alternatively or additionally, two sections of a fluid line for a pressurized fluid lie above one another, for example, on the setting on of the blade such that the pressurized fluid can be conducted from one section into the other section.

The invention moreover relates to a blade head of a high-performance slicer or to a high-performance slicer, which comprises at least one blade, in particular a spiral blade or a scythe-like blade, at least one blade mount and at least one counter-weight for setting the mass distribution, in particular for balancing, of the arrangement comprising the blade and the blade mount and rotating in operation, wherein the counter-weight is at least partly integrated into the blade mount. No separate counter-weight is required in this manner. A complex attachment of a counter-weight to the outer side of the blade after its attachment to the blade mount is in particular dispensed with.

In accordance with a further embodiment, the counter-weight is arranged at both sides of a blade plane. Dynamic imbalance can in particular thereby be compensated.

In accordance with a further embodiment, the blade mount comprises a carrier for the blade and a functional section movable relative to the carrier, wherein the counter-weight is split between the carrier and the functional section.

In accordance with a further embodiment, the functional section is a component of a fastening section for attaching the blade and/or of a clamping device for clamping the blade. The functional section can, for example, also be a component of a bayonet fastening. The functional section or the part of the counter-weight provided at the functional section is thus multifunctional.

In accordance with a further embodiment, at least one part of the counter-weight is formed by a functional part which bounds an inner space of the blade mount which can be pressurized. The counter-weight thus in particular forms at least one part of a pressure chamber of the blade mount.

The invention moreover relates to a blade head, in particular to a blade head in accordance with the invention, of a high-performance slicer or to a high-performance slicer having a blade in accordance with the invention and having a blade mount in accordance with the invention.

Finally, the invention also relates to a system having a blade head in accordance with the invention of a high-performance slicer or having a high-performance slicer and having a handling apparatus in accordance with the invention.

DRAWINGS

The drawings described herein are for illustrative purposes only of selected embodiments and not all possible implementations, and are not intended to limit the scope of the present disclosure.

Figure 4:
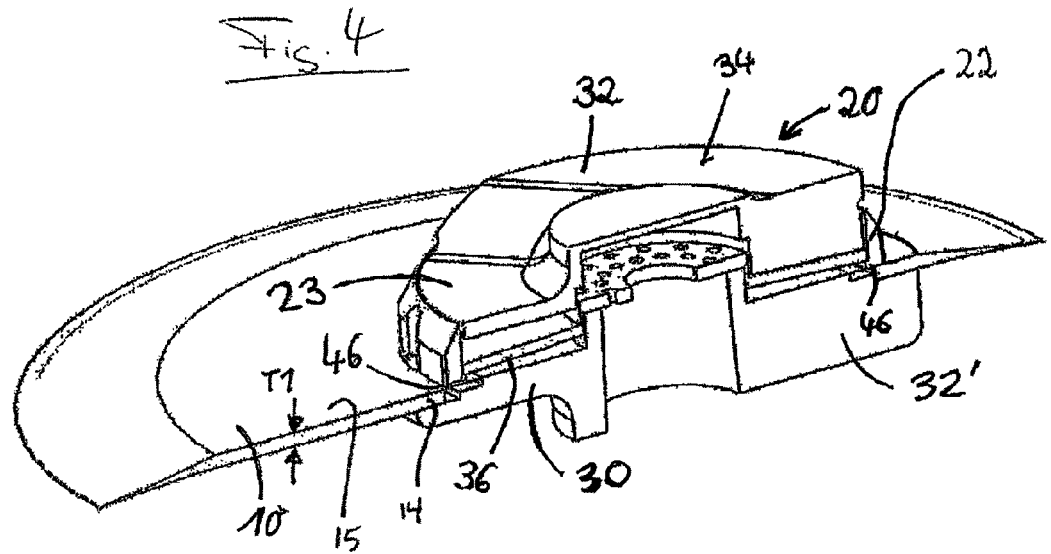
Figure 5:
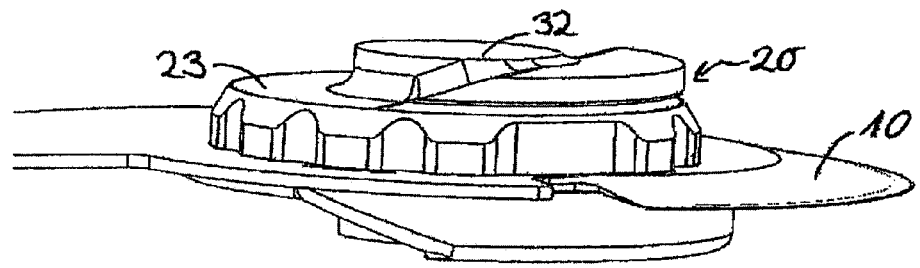
Figure 6:
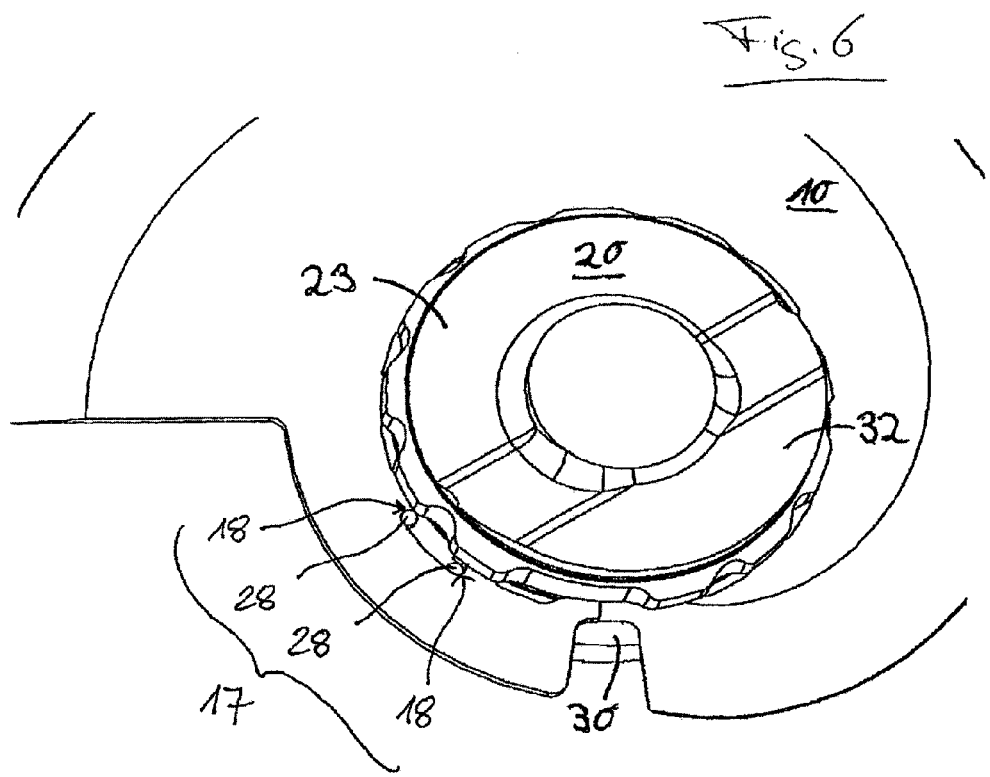
Figure 9:
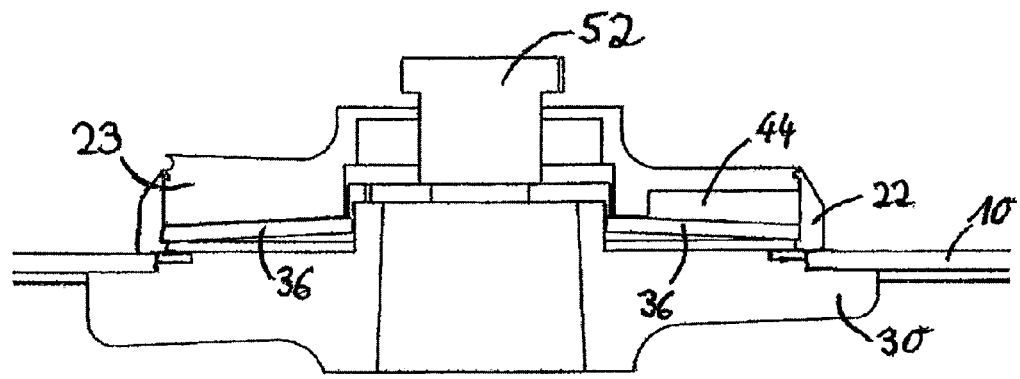

The invention will be described in the following by way of example with reference to the drawings. There are shown:

FIG. 1 a side view of an embodiment of a blade in accordance with the invention;

FIG. 2 a side view of an embodiment of a blade mount in accordance with the invention;

FIG. 3 a side view of an embodiment in which the blade is mounted in a blade mount;

FIG. 4 a sectional view of the embodiment in accordance with FIG. 3;

FIG. 5 a further side view of the embodiment in accordance with FIG. 3;

FIG. 6 a plan view of the embodiment in accordance with FIG. 3;

FIG. 7 a further sectional view of the embodiment in accordance with FIG. 3;

FIG. 8 an enlarged part representation of the embodiment in accordance with FIG. 7; and FIG. 9 is a sectional view of a second embodiment of a blade mount in accordance with the invention together with a blade.

DETAILED DESCRIPTION

Example embodiments will now be described more fully with reference to the accompanying drawings.

FIG. 1 shows a scythe-like blade 10 having a large central fastening opening 12. The fastening opening 12 is larger than, for example, a hole for leading through a conventional fastening screw. The fastening opening 12 is substantially circular, but can also be configured as an oval, rectangle or polygon, for example. The radius of the fastening opening 12 can e.g. amount to at least 1/10 of the largest radius of the scythe-like blade 10. The fastening opening 12 can, however, also be considerably larger so that, optionally, only a comparatively small margin of the scythe-like blade 10 remains which comprises the cutting edge. The area or size of the fastening opening 12 can, for example, take up at least one sixth of the area of the scythe-like blade 10.

The margin of the fastening opening 12 is "frayed". It in particular has a meandering shape. The margin of the fastening opening 12 can be of wave shape. Alternatively, it can be designed as star-shaped or, for example in the manner of a knurled-head screw. Other shapes are also conceivable.

Sections which project further into the center of the scythe-like blade 10 thus alternate with sections which protrude less far into the center of the scythe-like blade 10. The blade 10 thus has an inwardly directed, non-circular contour. The sections, in particular blade projections 14, 14', which project further into the center of the scythe-like blade 10, can be configured as lugs 14, 14'. They can, for example, be round or angled. The inwardly directed projections 14, 14' can have the same axial thickness T1 (FIGS. 4 and 8) as an inner blade region 15 adjacent to the marginal region in which the projections 14, 14' are disposed. Alternatively, they could also be flattened and could, for example, be thinner than the remaining part of the blade which is adjacent to the fastening opening 12.

The blade projections 14, 14' form a part of a bayonet fastening 16. It is also conceivable to arrange a plurality of bayonet fastenings 16.

Two of the blade projections 14 form a securing against rotation 17. It has two cut-outs 18 which can also be considered as one cut-out 18 having two end regions in operative communication with one another.

It is alternatively also conceivable only to use one cut-out 18 for the security against rotation 17. A plurality of cut-outs 18 are also conceivable. While the remaining marginal region of the fastening opening 12, in particular the lugs 14, are symmetrical viewed in the peripheral direction, a lug 14' is much larger. The lug 14' so-to-say forms an open oval. At this point, the margin of the fastening opening 12 thus has an asymmetrical portion.

FIG. 2 shows a blade mount 20. It has a rotational axis 21 and a ring 22 which serves as a fastening section for the scythe-like blade 10. The ring 22 is rotationally fixedly connected to a cover 34 and forms a first part 23 of the blade mount 20 with it. This first part 23 is axially movable with respect to a second part 30 of the blade mount 20 which comprises a contact section or surface 30a for the blade 10. The second part 30 of the blade mount 20 may be referred to as a support or carrier, and the contact section or surface 30a may be disposed within and/or define a contact plane. The ring 22 defines a locking section or surface 22a that cooperates with the contact section or surface 30a of the second part 30 to form a marginal mount region 22b. The marginal mount region 22b is a region between the locking section or surface 22a of the ring 22 and the contact section or surface 30a of the second part 30 in which the scythe-like blade 10 is mounted. The locking section or surface 30a may be disposed within and/or define a locking plane.

The ring 22 in particular has a mounting edge 22c that extends around an outer periphery of the ring 22 and is defined by recesses 24, 24' and mount projections 26 ("teeth") which alternate. They are shaped such that they correspond to the marginal blade region 13 in accordance with FIG. 1. The ring 22 so-to-say represents the "positive" of the "negative" of the margin of the fastening opening 12, i.e. the marginal blade region 13 and the ring 22 are configured complementary to one another.

The ring 22 can in particular have at least one recess 24' which extends over a longer section of the ring periphery than the remaining recesses 24. The recess 24' can in particular receive the lug 14'. A plurality of recesses 24' are also conceivable which can, for example, receive a plurality of lugs 14'. To set the blade 10 onto the blade mount 20, the blade 10 must thus be brought to the correct angular position.

The blade mount 20 has at least one securing pin 28 which engages with shape matching into the security against rotation 17. Two pins 28 are preferably provided of which, for example, one is movable and one is stationary. The pins 28 enter into engagement with the cut-outs 18 of the security against rotation 17.

The scythe-like blade 10 is therefore set onto the blade mount 20 by means of a handling apparatus, for example. The scythe-like blade 10 is in this respect rotated in such a manner until the lugs 14, 14' correspond to the position of the recesses 24, 24'. The scythe-like blade 10 is now pushed over the ring 22 until it impacts the contact section or surface 30a of the second part 30 of the blade mount 20. After passing the ring 22, the scythe-like blade 10 can be rotated again. The scythe-like blade 10 is adjusted against the direction of rotation in cutting operation. Finally, the scythe-like blade 10 latches, for example via a securing pin 28, and is thus prevented from rotating. The scythe-like blade 10 is thus unambiguously positioned.

The lugs 14, 14' are now located beneath the projections 26 of the blade mount 20 due to the rotation. The inwardly directed contour of the blade 10 thus lies beneath the projections 26 and is prevented from an axial movement in this manner. Thus, the underside surfaces of the projections 26 are disposed within the locking plane defined by the locking section or surface 22a of the ring 22. An axial spacing S1 (FIG. 8) between the contact plane of the second part 30 and the locking plane of the ring 22 is larger than the axial thickness T1 of the lugs 14, 14', at least in a release state of the blade mount 20 (e.g., before the scythe-like blade 10 is rotated to locate the lugs 14, 14' beneath the projections 26 of the blade mount 20). This difference between the axial spacing S1 and the axial thickness T1 provides a clearance so that, when the bade mount 20 is in the released state, the scythe-like blade 10 can be rotated relative to the blade mount 20 and/or the blade mount 20 can be rotated relative to the blade 10.

At least one of the pins 28 can in this respect be stationary, whereas the other can, for example, be preloaded via a spring and jumps upwardly when a cut-out 18 of the scythe-like blade 10 is located above it.

The actuation of at least one of the pins 28 can e.g. take place via the mentioned handling apparatus of the blade 10.

A counter-weight 32 is moreover shown in FIG. 2. This outer counter-weight 32 can, for example, be at least partly integrated into the blade mount 20. In the embodiment in accordance with FIG. 2, the counter-weight 32 is completely integrated into the blade mount 20. The counter-weight 32 can, for example, form a part of the cover 34.

The shape of the counter-weight 32 can differ from the shape shown in FIG. 2. For example, the counter-weight 32 can be flattened on the large scythe side of the scythe-like blade 10. It is also conceivable that the geometry of the blade mount 20 itself is flattened on the large scythe side.

Since the counter-weight 32 is not mounted at or in front of the scythe-like blade 10, the counter-weight does not have to be dismantled on a replacement of the scythe-like blade 10.

The mass distribution can be set by the counter-weight 32. A balancing of the rotating total system is in particular thereby possible. A static balancing with respect to the axis of rotation is hereby generally ensured. A dynamic imbalance is also countered by the arrangement of the counter-weight 32 provided here.

FIG. 3 shows the scythe-like blade 10 in accordance with FIG. 1 in the state attached to the blade mount 20 in accordance with FIG. 2. The scythe-like blade 10 is securely fixed in this position by the setting on, rotating and subsequent latching of the pins 28 into the security against rotation 17.

The blade mount 20 latches the contour, i.e. the lugs 14, 14', of the blade 10 at its counter-contour, i.e. the projections 26. An axial movement of the scythe-like blade 10 is prevented by this bayonet fastening 16.

For the final fastening of the scythe-like blade 10, the blade mount 20 can clamp the lugs 14, 14' of the scythe-like blade 10. This is possible, for example, with the aid of screws within the blade mount 20. Alternatively, springs can also be used which are themselves tensioned by screws for clamping the lugs 14, 14'.

For fastening the lugs 14, 14', alternatively or additionally, a plate spring or a plate spring package 36 is also conceivable as the spring arrangement 36 which is shown in FIG. 4. The plate springs 36 are preloaded such that the blade 10 is clamped in the normal state. As soon as the scythe-like blade 10 is located in the correct position on the blade mount 20, i.e. in particular after the latching of the pins 28, the plate spring 36 can act on the lugs 14, 14' of the scythe-like blade 10 and can fix the blade 10.

The blade 10 is thus clamped between the first part 23 and the second part 30 of the blade mount 20.

The plate spring 36 can e.g. act directly on the lugs 14, 14' of the scythe-like blade 10. The plate spring 36, however, preferably only acts indirectly via an inner side of the ring 22. This can have an inner projection 46 which is arranged between the plate spring 36 and the lugs 14, 14' of the scythe-like blade 10. This is shown enlarged in FIG. 8. The tongues 14, 14' of the blade 10 are thus acted on via the ring 22 with the aid of the plate spring 36.

Since the lugs 14, 14' of the scythe-like blade 10 are acted on permanently due to the preload of the plate spring 36, the scythe-like blade 10 is permanently fixed.

The clamping has to be actively overcome to remove the scythe-like blade 10 from the blade mount 20. If the actuation device used for this purpose fails, a secure clamping of the blade 10 is nevertheless ensured (safety clamping).

It is moreover shown in FIG. 4 that counter-weights 32, 32' are arranged at both sides of the blade plane. Both counter-weights 32, 32' are each provided in the regions which face the small section of the scythe-like blade 10.

FIG. 5 and FIG. 6 show two further views of a scythe-like blade 10 which is mounted on a blade mount 20.

A variant of the mentioned safety clamping is shown in FIG. 7 and FIG. 8. An actuation device 42 is needed to overcome the clamping.

A pneumatic device in fluid communication with an inner space 44, 44' can, for example, be provided as the actuation device 42. In this respect, the inner space 44, 44' is sealed and pressurized by the cover 50 which in particular simultaneously forms a part of the counter-weight 32, the ring 22 and the carrier 30. In this respect, the total inner space 44, 44' containing the plate spring 36 is pressurized or is acted on by excess pressure. The plate spring 36 lies on an inner projection 46 of the ring 22. A membrane skin 48, which is also simply called a spring in the following, extends between the inner projection 46 and the carrier 30 and in particular connects these components in one piece. It seals the inner space 44, 44' and in particular acts in the manner of a film hinge on an axial movement of the first part 23 relative to the second part 30. The ring 22, the inner projection 46, the membrane 48 and the carrier 30 can in particular be formed as a single-piece component.

If the inner space 44, 44' is pressurized, the cover 50 of the blade mount 20 moves upwardly. The ring 22 is in this respect taken along by the cover 50 and is likewise moved upwardly. The plate spring 36 is also moved upwardly radially outwardly against its preload by the inner projection 46 and is tensioned more in so doing. The plate spring 36 cannot move further upwardly radially inwardly since it contacts a stationary shoulder.

The blade 10 thereby becomes free. The membrane 48 thus provides both a leak-tightness of the inner space 44, 44' and the required relative movability of the components for cancelling the clamping state.

Due to the use of a pneumatic system, screws are no longer required to fasten the blade 10. In various implementations, the actuation device 42 may comprise a hydraulic device or an electric device.

As an alternative to the pneumatic solution, a single screw 52 can also be used as the actuation device which is shown in FIG. 9. Alternatively, a plurality of screws 52 can also be used. Other clamping elements 52 are also conceivable as the actuation device. The plate spring 36 is additionally tensioned by rotating the clamping screw 52 in that the plate spring is drawn upwardly over the ring 22. The use of a clamping screw 52 has the advantage that this system has a particularly simple design.

The clamping of the blade can therefore be actively overcome purely mechanically and/or pneumatically.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blade mount for a high-speed slicer, the blade mount being configured such that a blade can be attached thereto by first moving the blade in an axial direction parallel to a rotational axis of the blade mount to place the blade on the blade mount, and then securing the blade in the axial direction at the blade mount by rotating the blade about the rotational axis relative to the blade mount and/or by rotating the blade mount about the rotational axis relative to the blade, the blade mount comprising:
 a first part including a ring and a plurality of mount projections spaced apart around a periphery of the ring and projecting radially outwardly from the periphery of the ring, the ring and the plurality of mount projections being formed as a single component, wherein the plurality of mount projections are configured to secure the blade in the axial direction at the blade mount when the blade is placed on the blade mount and at least one of:
  the blade is rotated about the rotational axis relative to the blade mount; and
  the blade mount is rotated about the rotational axis relative to the blade;
 a second part; and
 a clamping device, wherein:
  the clamping device can be adjusted between a release state and a clamping state; and
  the clamping device clamps the blade between the first part and the second part such that the first and second parts contact opposite faces of the blade when the clamping device is in the clamping state and the blade is disposed between the first and second parts.

2. A blade mount in accordance with claim 1, wherein the blade mount has a fastening section for a fastening opening of the blade which is bounded by a marginal mount region.

3. A blade mount in accordance with claim 1, wherein the blade mount has a mount-side component of a security against rotation for the blade.

4. A blade mount in accordance with claim 3, wherein the mount-side component comprises at least one securing pin or two securing pins spaced apart in a peripheral direction.

5. A blade mount in accordance with claim 4, wherein at least one securing pin is able to be lowered by means of the blade against a restoring force on the attachment of the blade.

6. A blade mount in accordance with claim 3, wherein the security against rotation is arranged or formed at a contact area for the blade disposed radially outside a marginal mount region.

7. A blade mount in accordance with claim 1, wherein the blade mount has a contact section having a contact area for the blade which is spaced apart in the axial direction with respect to a marginal mount region.

8. A blade mount in accordance with claim 7, wherein an axial spacing is present between a contact plane defined by the contact area and a locking plane which is defined by a rear side of the marginal mount region facing in a direction of the contact plane.

9. A system having a blade mount in accordance with claim 1 and having a blade which is configured for attachment to the blade mount by first moving the blade in the axial direction to place the blade on the blade mount and then securing the blade in the axial direction at the blade mount by rotating the blade about the rotational axis relative to the blade mount and/or by rotating the blade mount about the rotational axis relative to the blade.

10. A system in accordance with claim 9, wherein the blade has a single central fastening opening which is bounded by a marginal blade region.

11. A system in accordance with claim 9, wherein a marginal mount region has a larger axial thickness than a marginal blade region, and/or wherein a marginal blade region and a marginal mount region are coordinated with one another such that on setting on the blade, a rotation of the blade is suppressed until the marginal blade region has passed the marginal mount region.

12. A system in accordance with claim 9, wherein:
 the first part includes a mounting edge;
 the second part has a contact surface that defines a contact plane;
 a rear side of the mounting edge faces in a direction of the contact plane and defines a locking plane;
 the contact plane and the locking plane are parallel to and spaced apart from one another; and
 an axial spacing between the contact plane and the locking plane of the blade mount is larger in at least the release state of the blade mount than an axial thickness of a marginal blade region bounding a fastening opening.

13. A system in accordance with claim 12, wherein the axial spacing is smaller than 1 mm, or smaller than 0.5 mm, or smaller than 0.3 mm, or smaller than 0.1 mm.

14. A system in accordance with claim 9, wherein the clamping device clamps the blade at a marginal blade region which bounds a central fastening opening of the blade.

15. A system in accordance with claim 14, wherein the central fastening opening of the blade is bounded at a plurality of radially inwardly directed blade projections of the marginal blade region.

16. A blade head of a high-performance slicer, the blade head having a system in accordance with claim 9.

17. A high-performance slicer having a system in accordance claim 9.

18. A blade mount in accordance with claim 1, wherein the first part is formed by a fastening section for a fastening opening of the blade.

19. A blade mount in accordance with claim 18, wherein the first part is formed by a marginal mount region bounding the fastening section.

20. A blade mount in accordance with claim 1, wherein the second part is formed by a contact section for the blade.

21. A blade mount in accordance with claim 1, wherein the clamping device comprises a spring arrangement which acts between the first part and the second part.

22. A blade mount in accordance with claim 1, wherein the clamping device is preloaded into the clamping state.

23. A blade mount in accordance with claim 1, wherein the clamping device comprises at least one plate spring and/or at least one plate spring package.

24. A blade mount in accordance with claim 1, wherein the clamping device is adjustable by setting on the blade.

25. A blade mount in accordance with claim 1, further comprising an actuation device configured to adjust the clamping device between the release state and the clamping state.

26. A blade mount in accordance with claim 25, wherein the actuation device acts against a preload on the clamping device to adjust the clamping device from the clamping state into the release state when the actuation device is actuated.

27. A blade mount in accordance with claim 25, wherein at least one of:
the actuation device is a pneumatic device, a hydraulic device or an electric device; and
the actuation device exerts excess pressure on a closed inner space of the blade mount on actuation.

28. A blade mount in accordance with claim 1, wherein at least one counter-weight is provided for setting the mass distribution of the arrangement comprising the blade and the blade mount and rotating in operation, with the counter-weight being at least partly integrated into the blade mount.

29. A blade mount in accordance with claim 28, wherein at least a part of the counter-weight is formed by a functional part which bounds an inner space of the blade mount which can be pressurized, and/or wherein the counter-weight is arranged at both sides of a blade plane.

30. A blade mount in accordance with claim 1, wherein the clamping device is adjustable between the release state and the clamping state by rotating the blade about the rotational axis relative to the blade mount and/or by rotating the blade mount about the rotational axis relative to the blade.

31. A blade mount in accordance with claim 1, wherein one of the first part and the second part moves in the axial direction relative to the other one of the first part and the second part when the clamping device is adjusted between the release state and the clamping state.

32. A blade mount in accordance with claim 1, wherein the clamping device includes a biasing member configured to bias the first part toward the second part, and thereby clamp the blade between the first and second parts, when the blade is disposed between the first and second parts.

33. A blade mount in accordance with claim 32, wherein the blade mount further comprises:
a cover attached to a first end of the ring; and
a membrane attaching a second end of the ring to the second part, wherein the cover, the membrane, the ring, and the second part cooperate to form an inner space of the blade mount in which the biasing member is disposed.

34. A blade mount in accordance with claim 33, wherein:
the ring includes an inner projection that extends radially inward from the second end of the ring;
the biasing member is held between the cover and the inner projection on the ring; and
the biasing member applies a biasing force to the inner projection to bias the first part toward the second part.

35. A blade mount in accordance with claim 34, wherein the ring, the inner projection, the membrane, and the second part are formed as a single component.

36. A blade mount in accordance with claim 33, wherein the membrane acts as a hinge that allows the first part to move axially relative to the second part.

37. A blade mount in accordance with claim 33, further comprising an actuation device configured to pressurize the inner space of the blade mount to overcome the biasing force of the biasing member and move the first part away from the second part in order to release the blade from the blade mount.

38. A blade mount in accordance with claim 1, wherein the blade mount allows the blade to be removed from the blade mount while the entire first part remains attached to the second part.

39. A blade mount in accordance with claim 1, wherein the clamping device is adjustable between the release state and the clamping state by rotating the blade about the rotational axis relative to the blade mount.

40. A blade mount in accordance with claim 1, wherein the second part includes at least one pin and a spring, the at least one pin being configured to project into a pocket in the blade to prevent the blade from rotating relative to the blade mount, the spring preloading the at least one pin to cause the at least one pin to move upward into the pocket in the blade when the pocket is above the at least one pin.

41. A blade mount in accordance with claim 40, wherein the at least one pin includes a pair of pins spaced apart in a peripheral direction and configured to engage opposite ends of the pocket in the blade.

42. A blade mount for mounting a blade in a high-speed slicer, the blade mount comprising:
a retainer configured to retain the blade in the blade mount, the retainer including a ring and a plurality of mount projections spaced apart around a periphery of the ring and projecting radially outwardly from the periphery of the ring; and
a carrier configured to support the blade, the carrier including a base, at least one pin configured to project axially from the base and into a pocket in the blade to prevent the blade from rotating relative to the blade mount, and a spring preloading the at least one pin to cause the at least one pin to move axially into the pocket in the blade when the pocket is aligned with the at least one pin.

43. A blade mount in accordance with claim 42, wherein the at least one pin includes a pair of pins spaced apart around a periphery of the base and configured to engage opposite ends of the pocket in the blade.

44. A blade mount in accordance with claim 43, further comprising a biasing element disposed between the retainer and the carrier and configured to bias the retainer toward the carrier to clamp the blade between the mount projections of the retainer and the base of the carrier when the pins engage the opposite ends of the pocket in the blade.

45. A blade mount in accordance with claim 42, wherein the plurality of mount projections of the retainer are axially spaced from the base of the carrier by an amount that allows blade projections on the blade to be inserted between the mount projections.

* * * * *